(12) United States Patent
Warnke et al.

(10) Patent No.: US 8,010,311 B1
(45) Date of Patent: Aug. 30, 2011

(54) SYSTEM AND METHOD FOR CONFIGURING A THERMAL IMAGING INSTRUMENT

(75) Inventors: Stefan H. Warnke, Santa Cruz, CA (US); James T. Pickett, Santa Cruz, CA (US); Thomas Heinke, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 12/754,516

(22) Filed: Apr. 5, 2010

Related U.S. Application Data

(62) Division of application No. 11/672,877, filed on Feb. 8, 2007, now Pat. No. 7,693,679.

(51) Int. Cl.
*G01K 1/08* (2006.01)

(52) U.S. Cl. ...... 702/132; 116/207; 236/1 C; 250/252.1; 348/164; 374/121; 702/130

(58) Field of Classification Search .......... 702/130–136; 250/330, 352; 345/44, 87, 207; 348/164; 116/207; 236/1 C; 382/162; 374/120, 121
See application file for complete search history.

(56) References Cited

U.S. PATENT DOCUMENTS

| | | | |
|---|---|---|---|
| 6,382,125 B1 | 5/2002 | Tamura | |
| 6,606,115 B1 | 8/2003 | Alicandro et al. | |
| 7,093,974 B2 | 8/2006 | Kienitz | |
| 7,157,705 B2 | 1/2007 | Hamrelius et al. | |
| 7,304,297 B1 * | 12/2007 | King et al. | 250/252.1 |
| 2007/0057076 A1 | 3/2007 | Orozco | |

\* cited by examiner

*Primary Examiner* — John H Le
(74) *Attorney, Agent, or Firm* — Perkins Coie LLP

(57) ABSTRACT

A graphical user interface for configuring parameters associated with a portable infrared imager is provided. The interface can be used to manually or automatically set range and span parameters. The interface can also be used to configure one or more alarms to notify a user that a detected temperature is outside a predetermined range. In some embodiments, a nonlinear temperature scale can be displayed.

8 Claims, 18 Drawing Sheets

SYSTEM AND METHOD FOR CONFIGURING A THERMAL IMAGING INSTRUMENT

CROSS-REFERENCE TO PRIOR APPLICATIONS

This application is a divisional of U.S. patent application Ser. No. 11/672,877, filed Feb. 8, 2007, now U.S. Pat. No. 7,693,679, issued Apr. 6, 2010, which is incorporated herein by reference.

TECHNICAL FIELD

The following is related to a graphical user interface for configuring an infrared thermal imaging instrument, and more particularly, to an interface for defining and viewing display parameters.

BACKGROUND

Infrared thermal imaging instruments commonly are used for obtaining temperature profiles of objects such as industrial machines or components of operating equipment. Inspecting an object's operating temperature conditions can reveal whether a failure is imminent or a machinery adjustment is necessary.

Thermal imaging instruments are necessary because the human eye cannot perceive temperature directly. Thermographic imaging systems operate by mapping detected temperatures to the spectrum of visible light. A relatively cold temperature may be displayed as a black or blue color while a relatively hot temperature may be displayed as a red or white color. Given the large number of discrete temperatures an imager can detect and the relatively small number of colors that can be displayed on a typical screen and appreciated by the human eye, it is not practical to map every detectable temperature to a unique color. Instead, it is desirable to map only a subset of the detectable temperatures to the displayed color range.

Known thermal imagers map a large range of detectable temperatures to a smaller color range and some known thermal imagers provide user configuration options. Typically, however, such systems are unintuitive and difficult to use. Furthermore, while these systems may present the user with various configuration options, no intuitive or graphical indication is provided to assist the user in successfully configuring or understanding the display.

SUMMARY

Systems and methods for displaying a configuration of a portable imaging device and a graphical user interface for a portable imaging device are disclosed.

DETAILED DESCRIPTION

Interface Overview

Figure 1A:
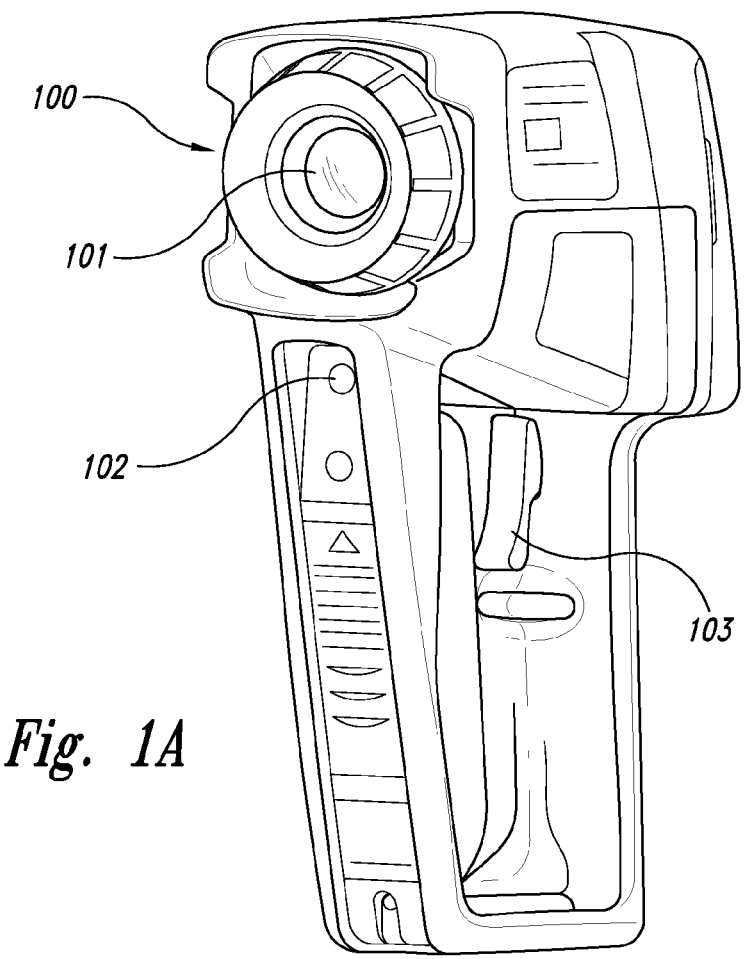
FIGS. 1A-C illustrate exemplary features of an imager.
Figure 1B:
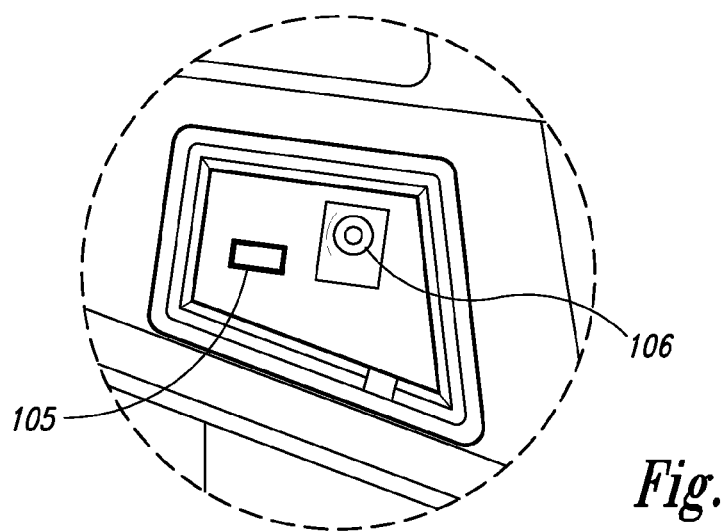
Figure 1C:
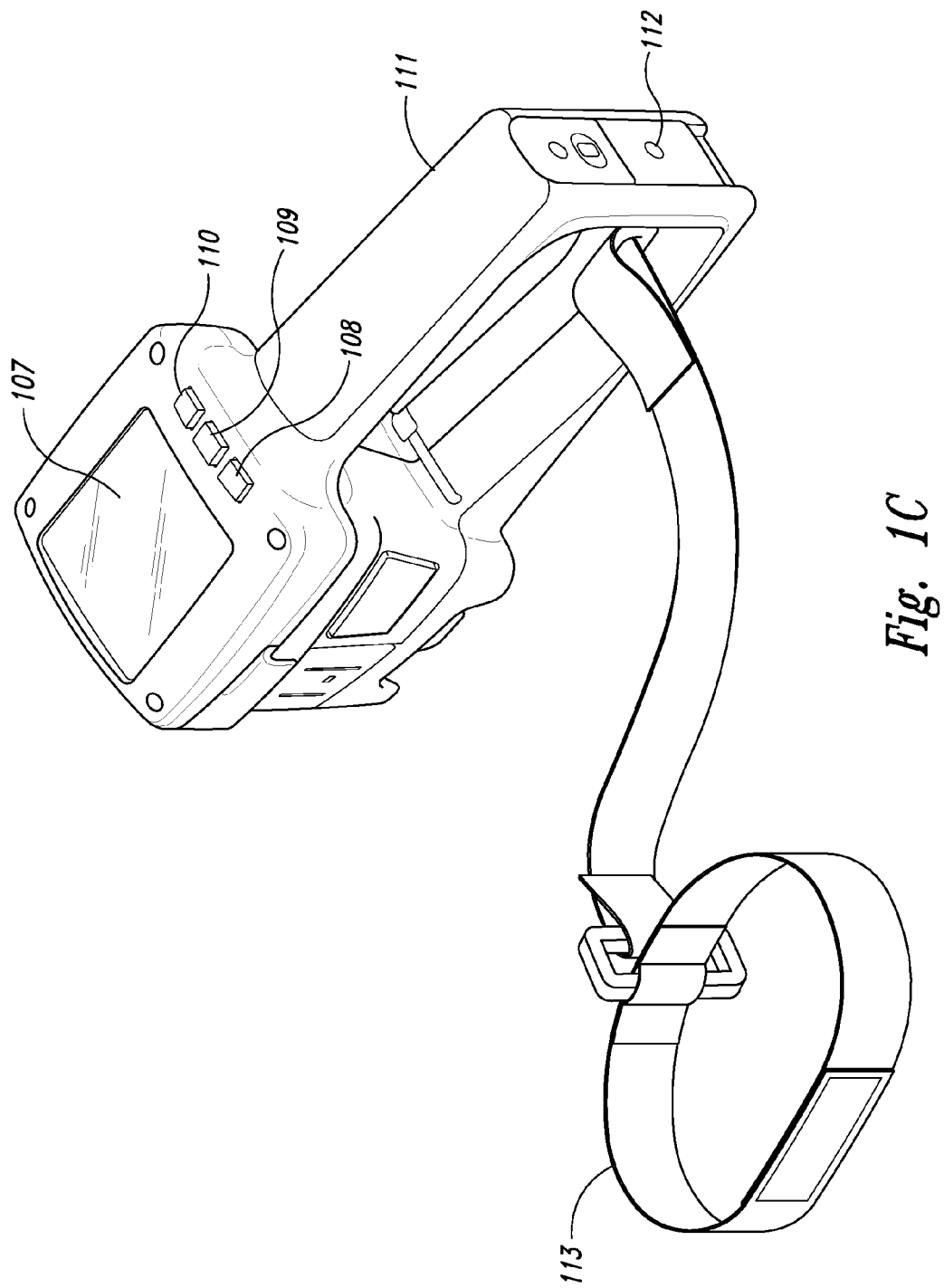

The graphical user interface described herein can be used on a thermographic imager such as the one illustrated in FIGS. 1A-C. With reference to FIG. 1A, the imager can include a focus control 100, an optical channel 101, a laser aperture 102, and a trigger 103. With reference to FIG. 1B, the imager can also include a USB port 105 and an AC adapter terminal 106. With reference to FIG. 1C, the imager can include a display 107, one or more soft keys 108-110, a battery compartment 111, a threaded tripod mount 112, and a wrist strap 113. Variations are possible and an imager need not include all of these elements.

Figure 2:
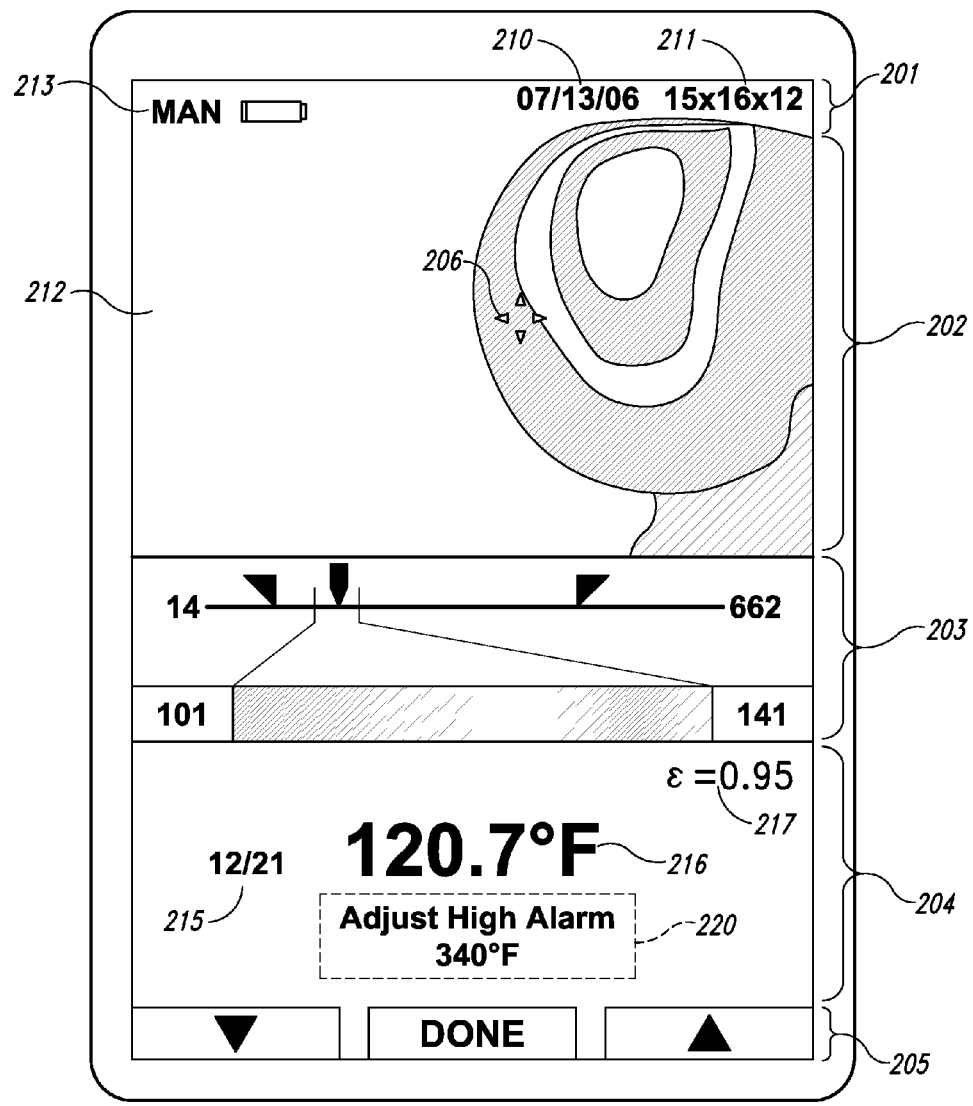
FIG. 2 illustrates an exemplary graphical interface for display on a portable imager.

FIG. 2 illustrates an exemplary user interface to be displayed on a portable imager. The interface can include a status area 201, an image area 202, a range bar area 203, a data area 204, and a soft key label area 205. As non-limiting examples, status area 201 can display information such as date 210, time 211, and battery level 212. Status area 201 can also display a label 213 or icon indicating manual or automatic configuration of display parameters. In the example illustrated in FIG. 2, the display of the "MAN" label 213 indicates that the display parameters have been manually configured. Image area 202 can be configured to display thermographic image data in a range of available colors. Image area 202 can include a cursor 206 for identifying a certain portion of the image for which a numeric temperature can be displayed. Data area 204 can display information such as image sequence number 215, temperature 216 at the cursor 206, emissivity 217, and other information in message area 220. In the example illustrated in FIG. 2, alarm information is displayed in message area 220. As described below in further detail, range bar area 203 can display thermal data from the imaged scene relative to the range of temperatures detectable by the imager.

Figure 3:
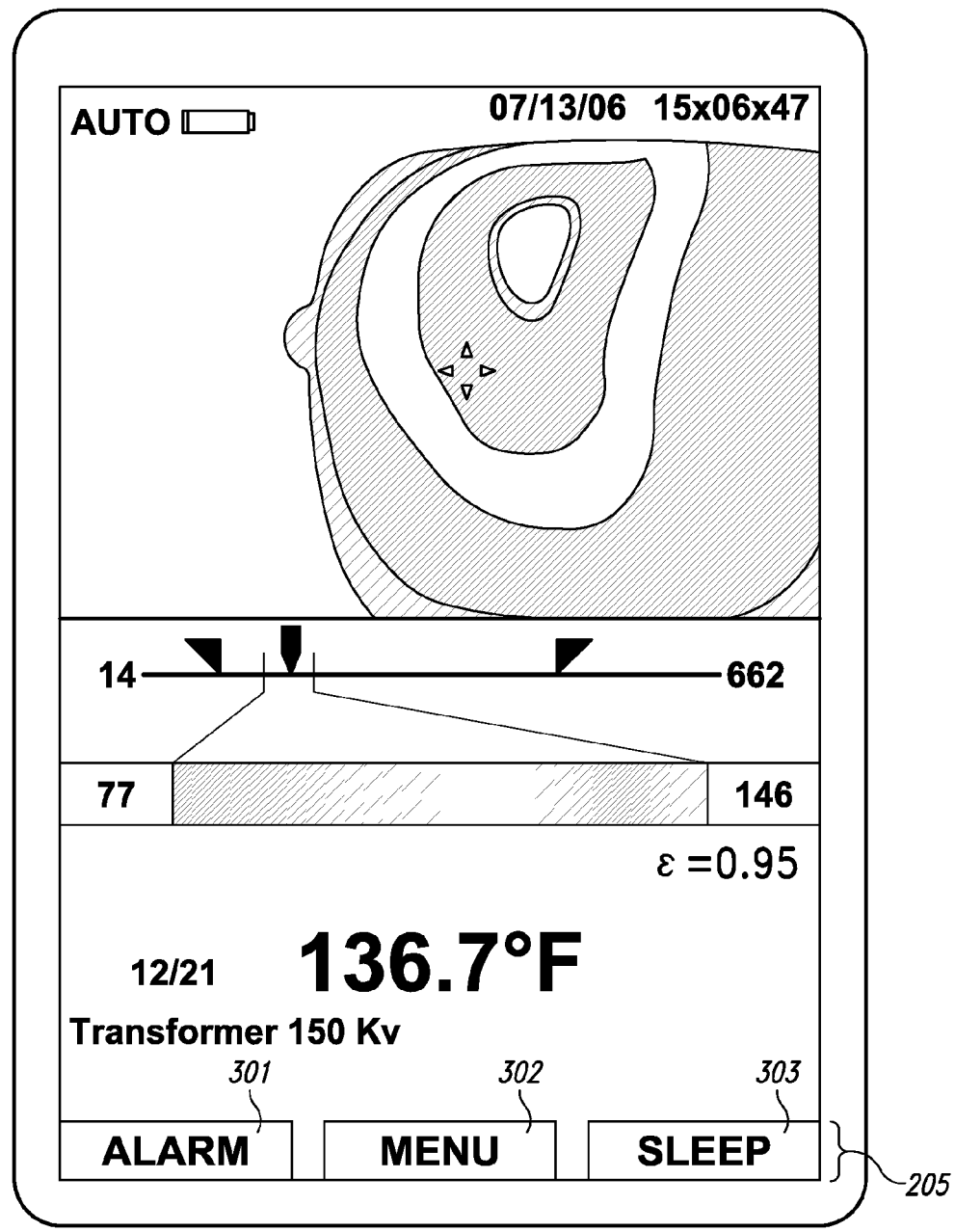
FIG. 3 illustrates an exemplary graphical interface for displaying key labels.

Key label area 205 can display graphical or textual soft key labels associated with the soft keys 108-110 illustrated in FIG. 1. The interface on the imager can be configured so that the functions implemented by the soft keys 108-110 are context specific and can be used for different purposes at different times. With reference to FIG. 3, several key labels 301-303 can be displayed in label area 205. For example, "ALARM" soft key label 301 can correspond to soft key 108, "MENU" soft key label 302 can correspond to soft key 109, and "SLEEP" soft key label 303 can correspond to soft key 110. Pressing any soft key can invoke the function shown above the key on the display. In the exemplary embodiments illustrated in FIGS. 2 and 3, three keys and labels are shown. One of ordinary skill in the art would recognize that more or fewer keys could be present on an imager.

Temperature Mapping

Currently available thermographic imaging equipment is capable of detecting a finite range of temperatures. For example, a device may be capable of detecting temperatures in the range of 14° F. to 662° F. Some devices may be able to resolve temperatures as low as 0.1° F. As a result, such a device could be capable of detecting over five thousand unique temperatures. However, it may not be practical to map on the imager display every detectable temperature to a unique color. First, the display on the imager may not be able to display thousands of colors. For example, some displays may only be capable of displaying 256 colors. Second, a mapping of the entire detectable temperature range to the visible light spectrum would result in typical scenes being represented in one narrow band of color on the display. Most of the colors would be unused because they would be mapped to extreme temperatures not present in the scene. For example, all temperatures from 9° F. to 212° F. might be represented by various shades of green.

Several systems and methods for mapping detected temperatures to visible light colors and adjusting that mapping are described below.

Figure 4A:
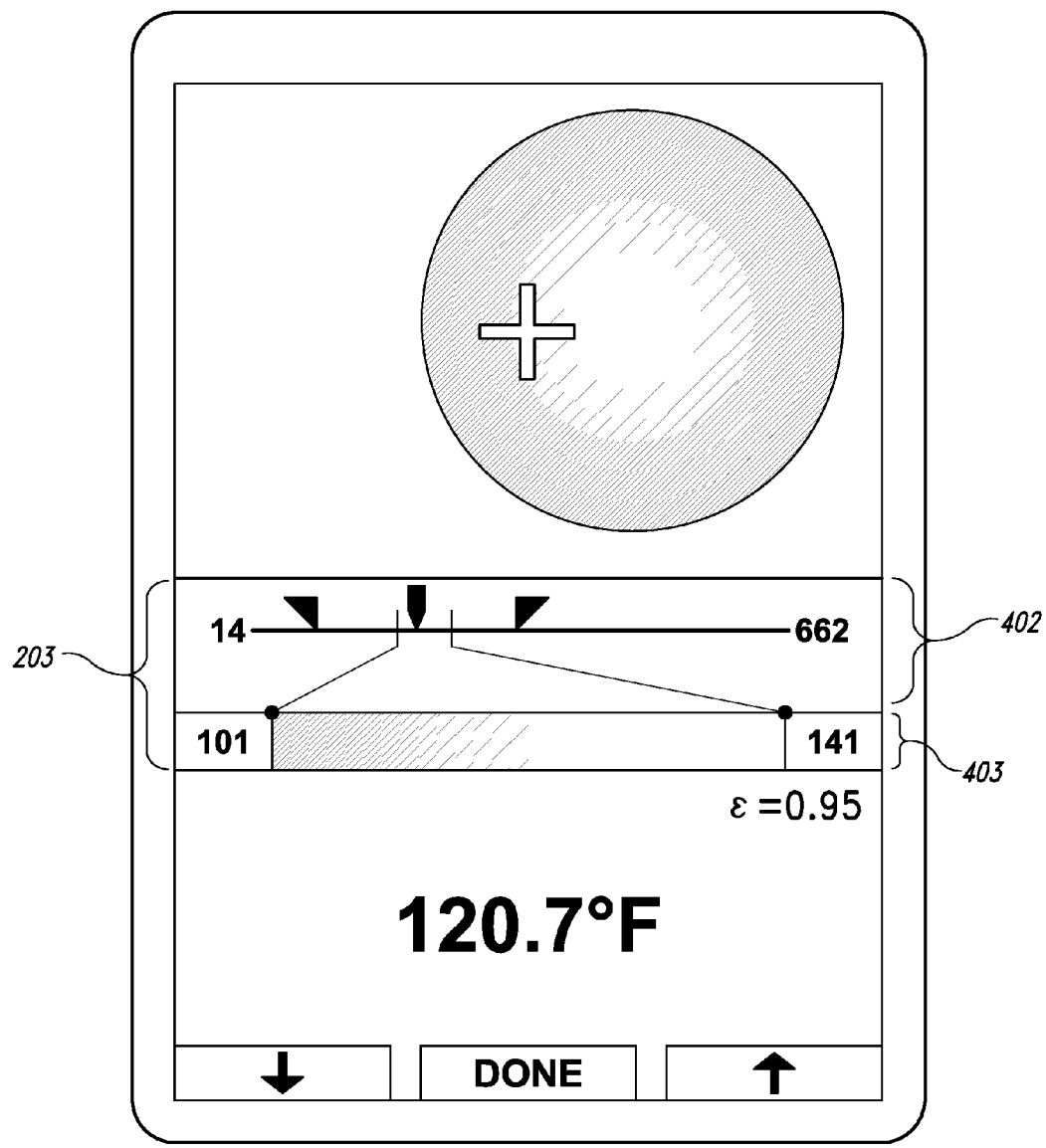
FIGS. 4A-E illustrate exemplary graphical interfaces for displaying range bars.

As illustrated in FIG. 4A, the range bar area 203 can be configured to display information about the thermographic device as well as the scene being imaged. Range bar area 203 can be divided into several components including a device component 402 and an image component 403. As illustrated in FIG. 4C, range bar area 203 can include temperature bounds 411 and 412. The temperature bounds 411 and 412 correlate the device component 402 to the image component 403.

The device component 402 of range bar area 403 can be configured to display a device range bar 410. The device range bar 410 can be displayed as a line having an origin and a destination, the origin corresponding to lowest temperature 405 detectable by the imager and the destination corresponding to the highest temperature 406 detectable by the imager. In the example illustrated in FIGS. 4A-C, the lowest detectable temperature is 14° F. and the highest detectable temperature is 662° F. In some embodiments, temperatures approximating the highest and lowest detected temperatures can be displayed instead of or addition to the highest and lowest detectable temperatures. In some embodiments, the device range bar 410 can be configured to use and display any other parameters relating to thermal imaging at the origin 405 and destination 406. In some embodiments, an interface can be provided through which a user can select one or more of the parameters to be used at endpoints 405 and 406.

As illustrated in FIG. 4C, a temperature cursor 407 also can be displayed on the device range bar 410. The position of temperature cursor 407 indicates the temperature sensed in the area covered by the display cursor 206 in the context of the full range of detectable temperatures. In some embodiments, temperatures 405 and 406 are not displayed on the screen numerically. While range bar 410 is illustrated in FIG. 4C as a horizontal line with an origin and a destination, one of ordinary skill in the art would recognize that other graphical representations of the temperature range could be used.

As discussed in more detail below, icons indicating a low temperature alarm 408 and a high temperature alarm 409 also can be included on or near the range bar 410. Corresponding lower and upper temperature alarm values could also be displayed at the origin 405 and destination 406, respectively. As illustrated in FIG. 4C, the alarm icons 408 and 409 can be placed within the ends of the range bar 410. Such placement of the alarm icons 408 and 409 can permit the display of a temperature above and or below an alarm temperature, thereby allowing a user to see by how much the alarm in question has been exceeded.

Figure 4B:
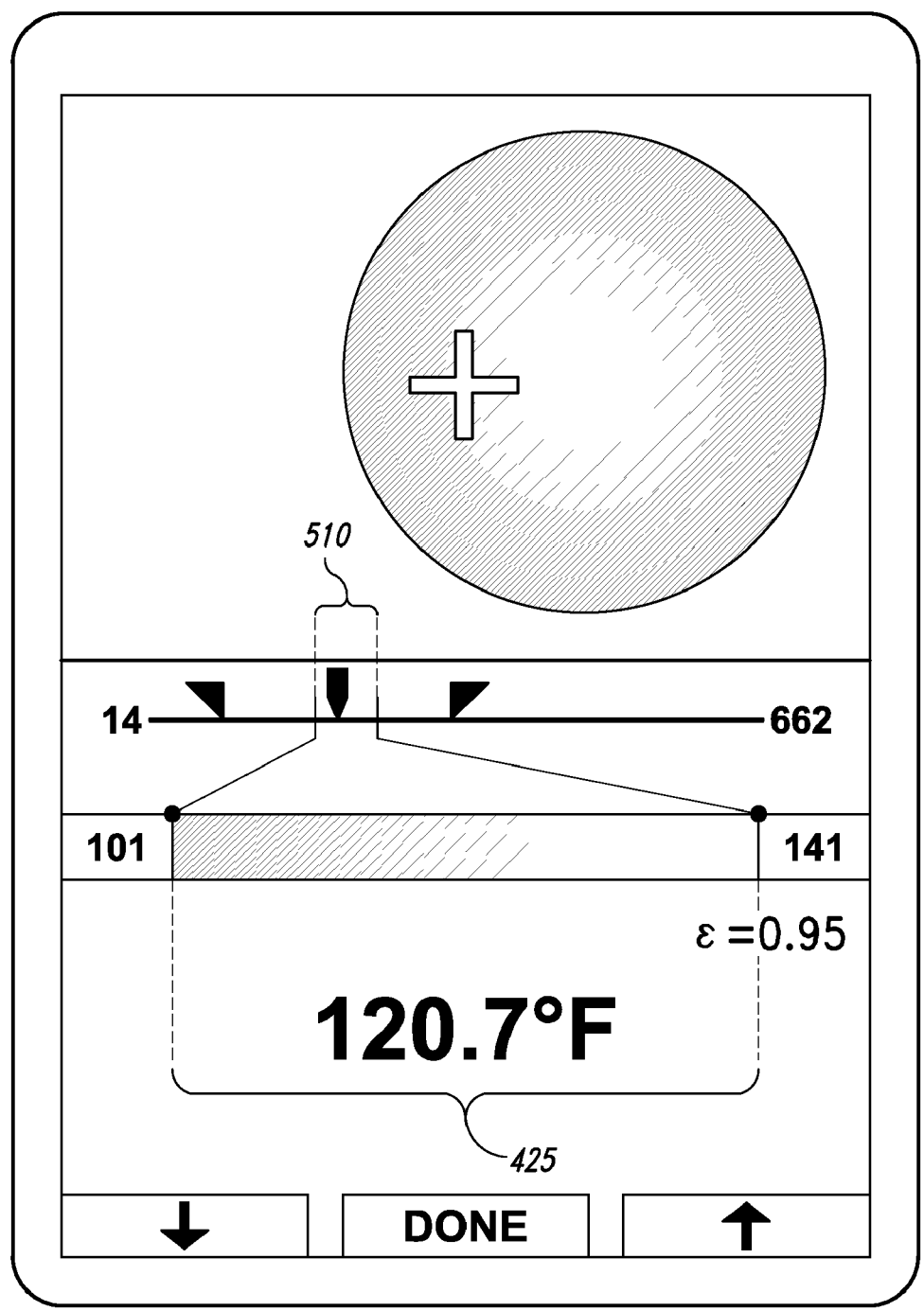
Figure 4C:
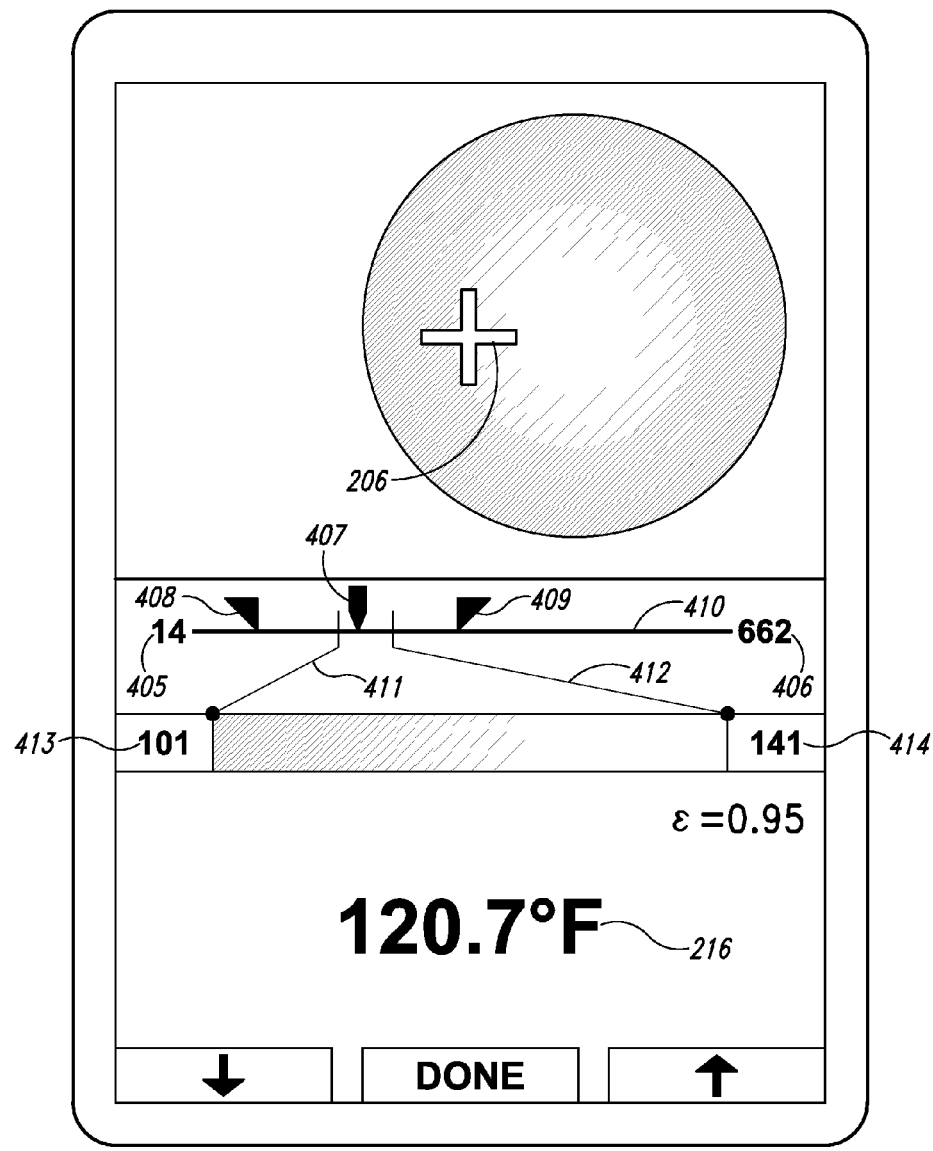

As illustrated in FIG. 4B, the image component 403 of range bar area 203 can be configured to display an image range bar 425 including colors representing the visible light spectrum. In the example illustrated in FIG. 4B, the spectrum runs from black to white and includes a range of colors in between. In some embodiments, the color spectrum is not displayed. Additionally or alternatively, in some embodiments, the image range bar 425 can be displayed as a line having an origin and a destination, the origin corresponding to black or any other temperature that is understood to represent the lowest temperature in an image and a destination corresponding to white or any other temperature that is understood to represent the highest temperature in an image.

The temperature bounds 411 and 412 graphically link the device component 402 and image component 403. As illustrated in FIGS. 4A-C, the temperature bounds include a lower temperature bound 411 and an upper temperature bound 412. Bounds 411 and 412 correspond to temperature points on the device range bar 410 in the device component 402. The lower bound 411 and upper bound 412 define a partial temperature range 510 within the full range of the lowest temperature (14° F.) and the highest temperature (662° F.) detectable by the device.

Figure 5:
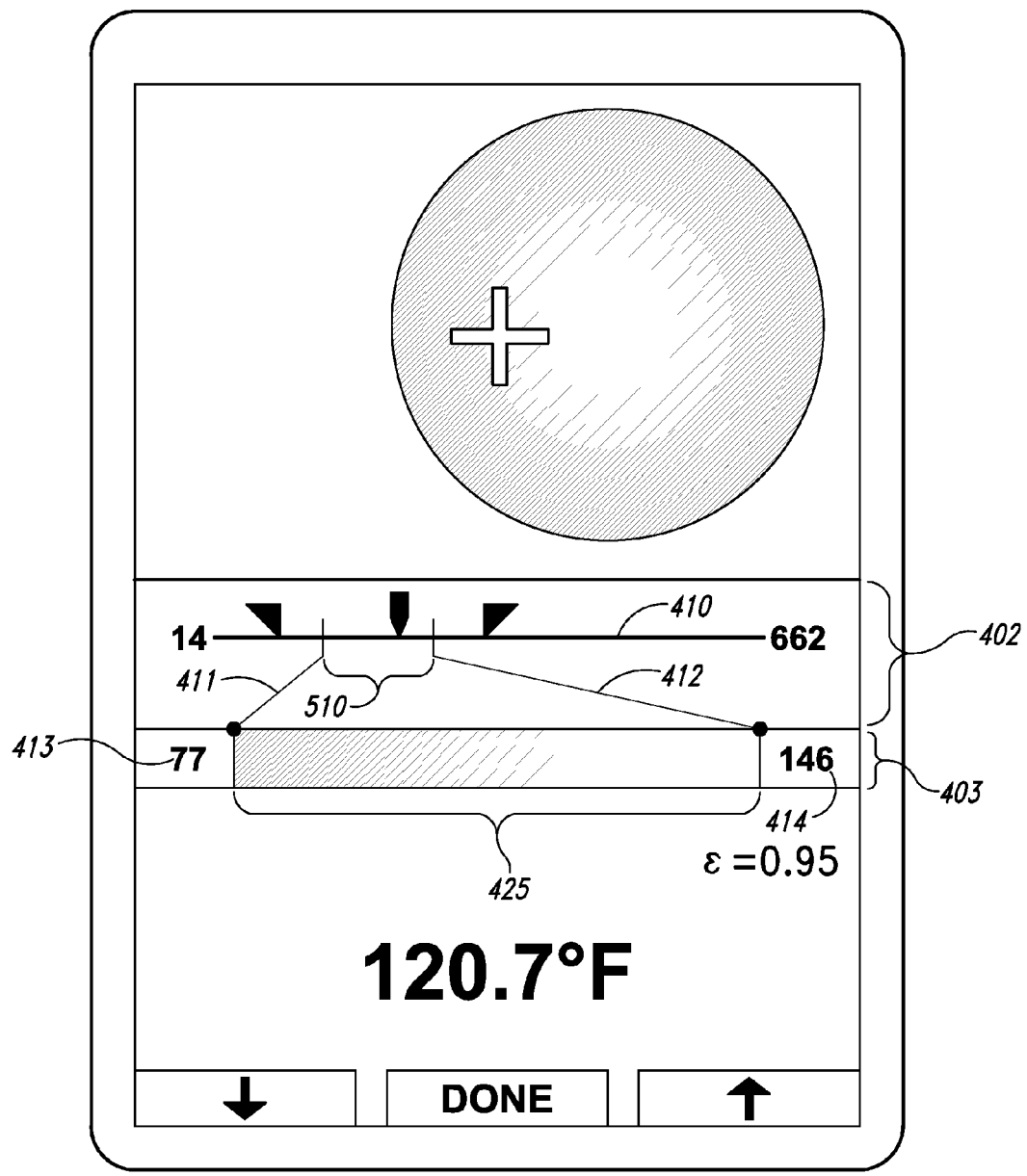
FIG. 5 illustrates an exemplary graphical interface for displaying range bars.

The temperature of the lower bound and upper bound can be displayed. As illustrated in FIGS. 4C and 5, the image component 403 can display the temperature 413 at the lower bound 411 and the temperature 414 at the upper bound 412. In the example illustrated in FIG. 5, the temperature of lower bound 411 is displayed 413 as 77° F. and the temperature of upper bound 412 is displayed 414 as 146° F.

Bounds 411 and 412 also correspond to points on the image range bar 425. In the example illustrated in FIG. 4C, bound 411 corresponds to black and bound 412 corresponds to white. The bounds 411 and 412 thereby map the partial temperature range 510 on the device range bar to a color gradient. As a result of the location of the bounds 411 and 412 on device range bar 410, only a certain range of temperatures will be mapped to the color spectrum. For example, a temperature such as 32° F. may be mapped to black and a temperature such as 212° F. may be mapped to white. Temperatures outside of that range would be handled as exceptions.

An interface can be provided so that a user can adjust the bounds 411 and 412 individually or together along device range bar 410. In some embodiments, one of the bounds can be moved individually to thereby increase or decrease the distance between the two bounds. In some embodiments, both of the bounds can be moved, in opposite directions, along device range bar 410 to thereby increase or decrease the distance between the two bounds. This is referred to as adjusting the span between the bounds. Moving the two bounds together, in the same direction, keeps the distance between the two bounds the same while shifting the pair along the device range bar 410. This is referred to as adjusting the level of the bounds.

Level Adjustment and Display

Figure 6:
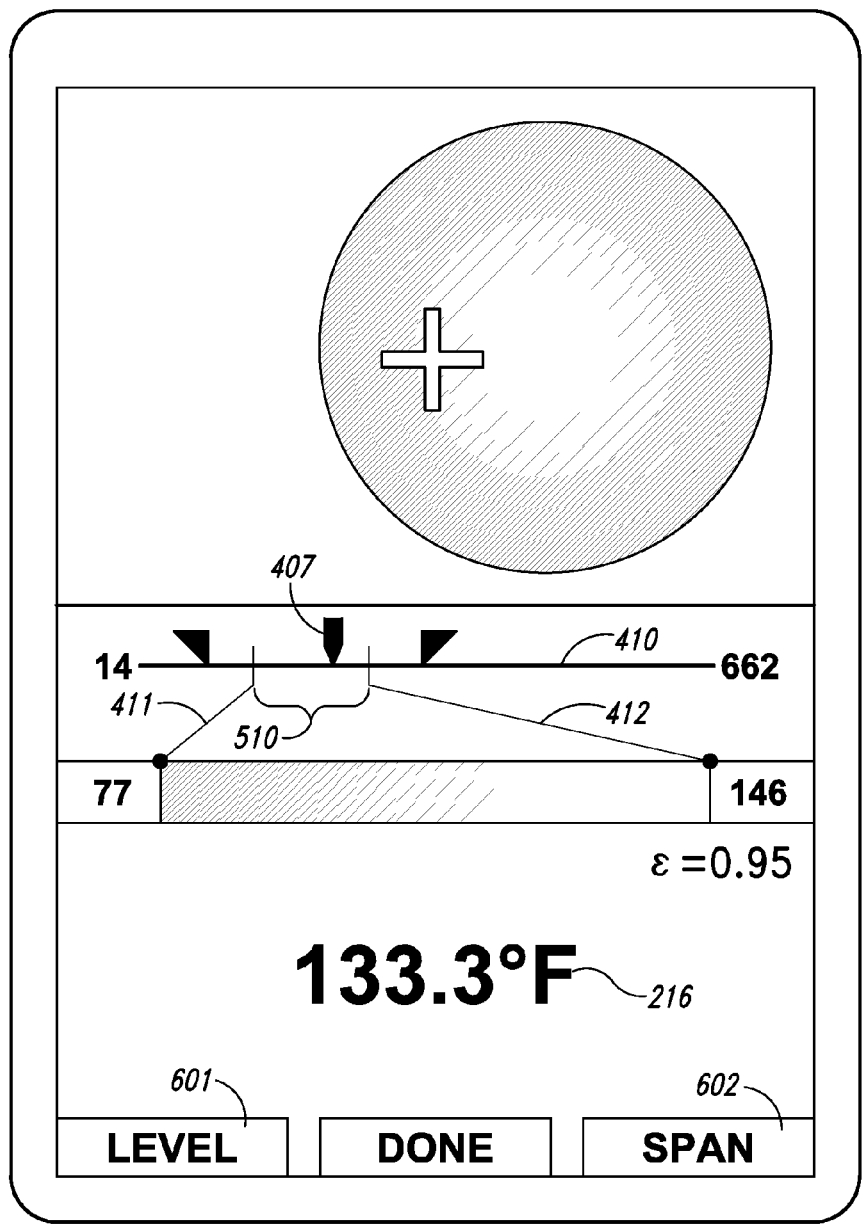
FIG. 6 illustrates an exemplary graphical interface for selecting a level or span.
Figure 7:
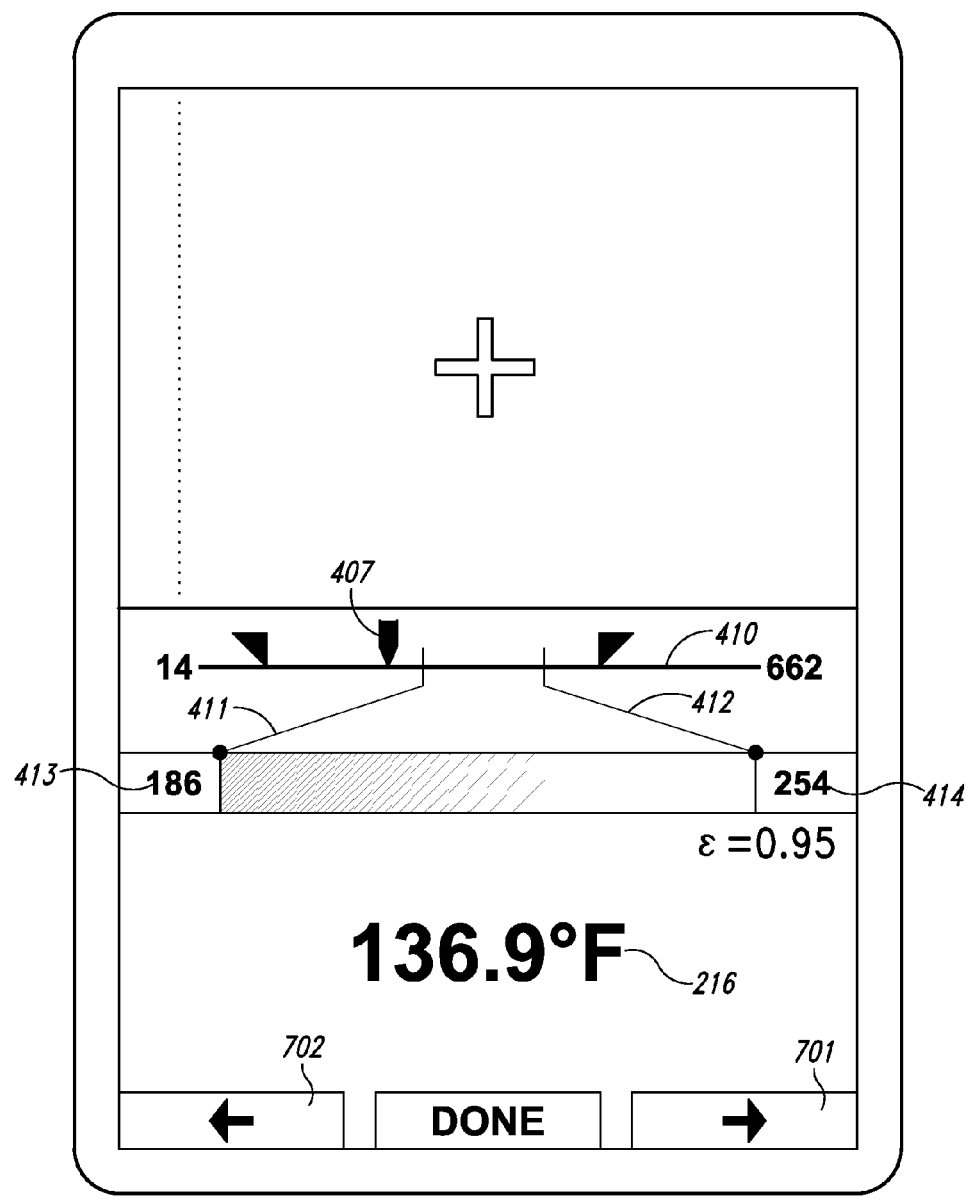
FIG. 7 illustrates an exemplary graphical interface for adjusting a level parameter.

To adjust the level, a user can actuate the soft key that corresponds to level option 601 illustrated in FIG. 6. Once the level option has been activated, level controls can be displayed as illustrated in FIG. 7. The level controls can include upward control 701 and downward control 702 for shifting the bounds along device range bar 410. FIG. 7 illustrates the bounds 411 and 412 having been shifted to the right (upward) on device range bar 410 with respect to their position in FIG.

Figure 8:
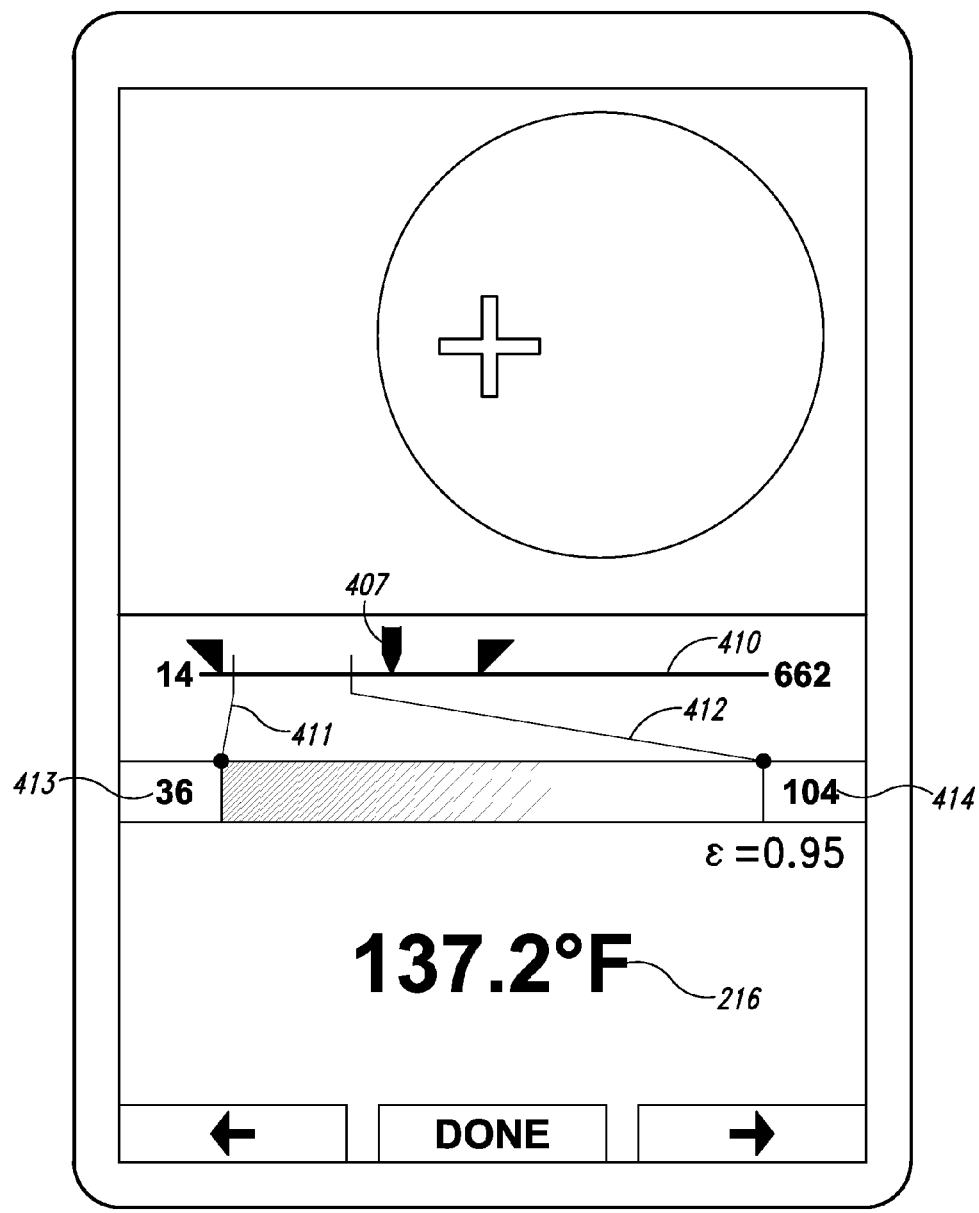
FIG. 8 illustrates an exemplary graphical interface for adjusting a level parameter.

6. FIG. 8 illustrates the bounds 411 and 412 shifted to the left (downward) on device range bar 410 with respect to their position in FIG. 6.

In FIGS. 6, 7, and 8, the level has been set at different positions along device range bar 410. In FIG. 7, the temperature cursor 407 is at 136.9° F. The lower bound is 411 is set at 186° F. and the upper bound 412 is set at 254° F. Temperature display 216 indicates that the cursor temperature 407 is 136.9° F. Because no portion of the image reached at least 186 degrees, the displayed image is black. In this example, the bounds have been configured to map the color spectrum to a range of temperatures that is higher than any object being imaged. No useful thermographic image can be displayed.

In FIG. 8, temperature display 216 indicates that the temperature cursor 407 is at 137.2° F. The lower bound 411 is set at 36° F. and the upper bound 412 is set at 104° F. In this example, the bounds have been configured to map the color spectrum to a range of temperatures that is mostly lower than most of the object being imaged. While a thermographic image is discernible in FIG. 8, most of the image is mapped to white.

In FIG. 6, temperature display 216 indicates that the temperature cursor 407 is at 133.3° F. The lower bound 411 is set at 77° F. and the upper bound 412 is set at 146° F. The temperature cursor 407 is well within the upper and lower bounds and the image displayed provides more useful thermographic information than the settings used in FIGS. 7 and 8. Thus, the level can be configured so that the visible color spectrum is mapped to a practically useful or optimal range of temperatures present in the scene being imaged.

Span Adjustment and Display

As discussed above, an exemplary imager may be able to detect temperatures between 14° F. to 662° F. (−10° C. to 350° C.) and display a corresponding image on an LCD display capable of displaying about 256 shades of color. By adjusting the temperature span, a user can see more subtle temperature gradients in a captured image. For example, if an image with a temperatures ranging from 70° F. to 90° F. is reviewed using a wide temperature span, the approximately 200 detectable temperatures in the image will be concentrated into only about 15 of the 256 shades that could be shown. Reducing the temperature span to 20° F., from 70° F. to 90° F., allows the user to view the imaged scene with the full range of about 256 shades of color.

Figure 9:
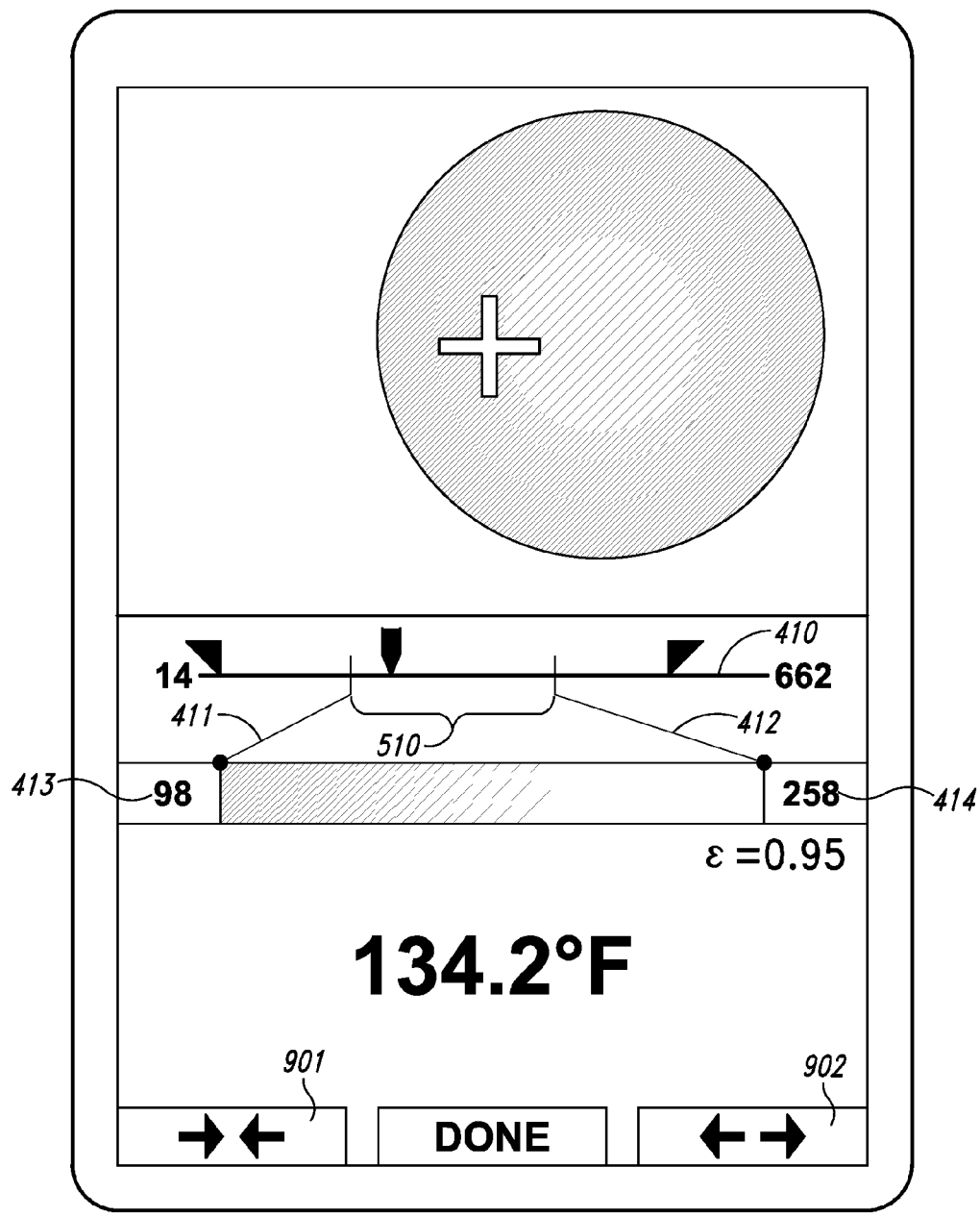
FIG. 9 illustrates an exemplary graphical interface for adjusting a span parameter.
Figure 10:
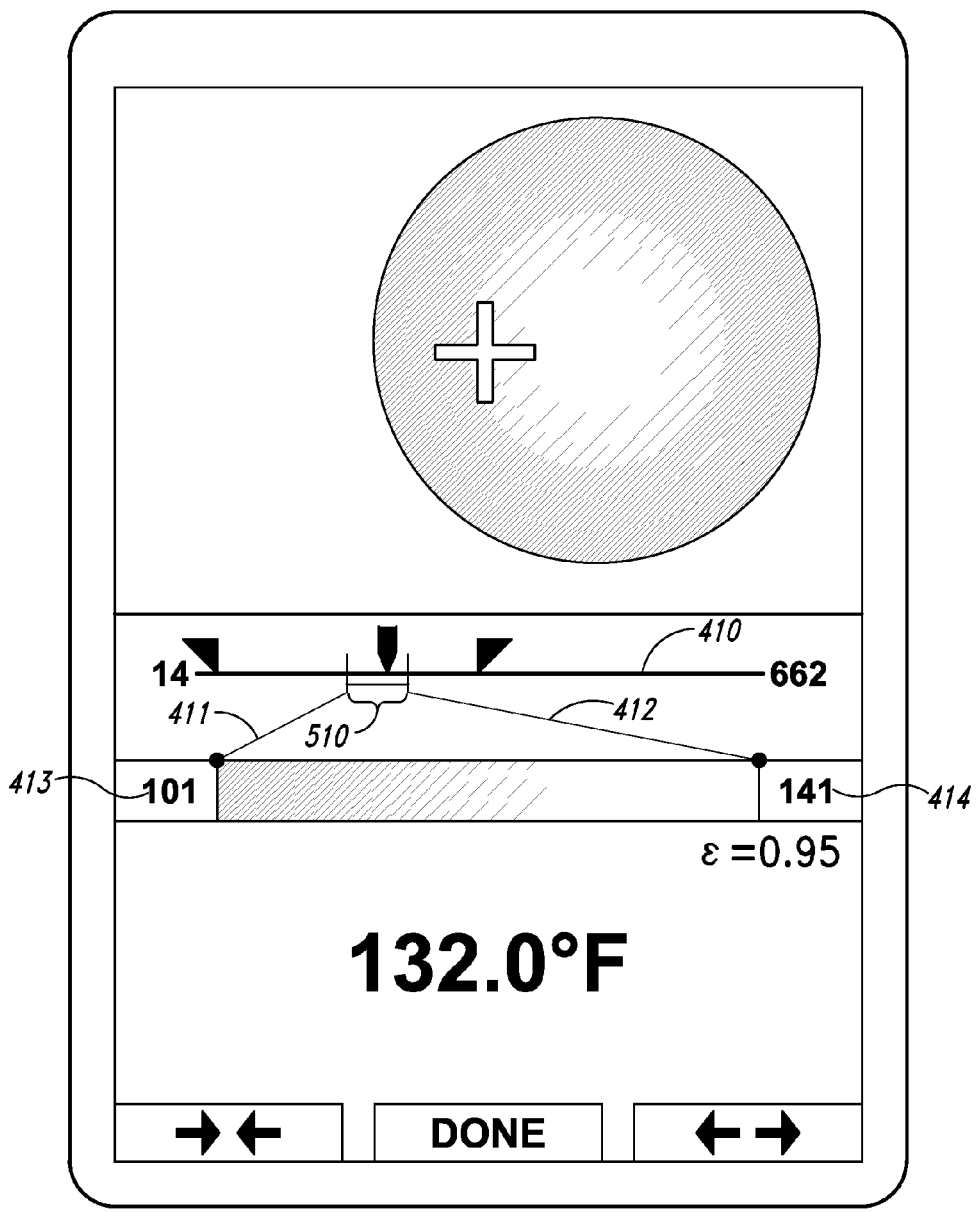
FIG. 10 illustrates an exemplary graphical interface for adjusting a span parameter.

To adjust the span, a user can actuate the soft key that corresponds to the span option 602 illustrated in FIG. 6. Once the span option has been activated, span controls can be displayed as illustrated in FIG. 9. The span controls can include narrowing control 901 for decreasing the span and widening control 902 for increasing the span between bound 411 and 412 on device range bar 410. FIG. 9 illustrates the span 510 having been increased with respect to the span 510 in FIG. 6. While the span illustrated in FIG. 6 covers 77° F. to 146° F., the span 510 between low bound 413 and high bound 414 illustrated in FIG. 9 covers 98° F. to 258° F., about twice the range of the span 510 in FIG. 6. In FIG. 10, the span 510 has been decreased with respect to the span 510 in FIG. 6. While the span 510 illustrated in FIG. 6 covers 77° F. to 146° F., the span 510 between low bound 413 and high bound 414 illustrated in FIG. 10 covers about 40° F., about half the range of the span 510 in FIG. 6.

In FIG. 9, the available color spectrum is mapped to the range of 98° F. to 258° F., about 160° F. In FIG. 10, the available color spectrum is mapped to the range of 101° F. to 141° F., about 40° F. Both figures illustrate the display thermographic images of the same object. In FIG. 9, the color spectrum is mapped to a larger temperature span and, as a result, fewer colors are available for the particular temperature range of the object being imaged. In FIG. 10, the color spectrum is mapped to a narrower temperature span that more closely matches the temperatures of the object. Thus, more colors are available for the particular temperature range of the object being imaged when the span is selected appropriately.

Figure 4D:
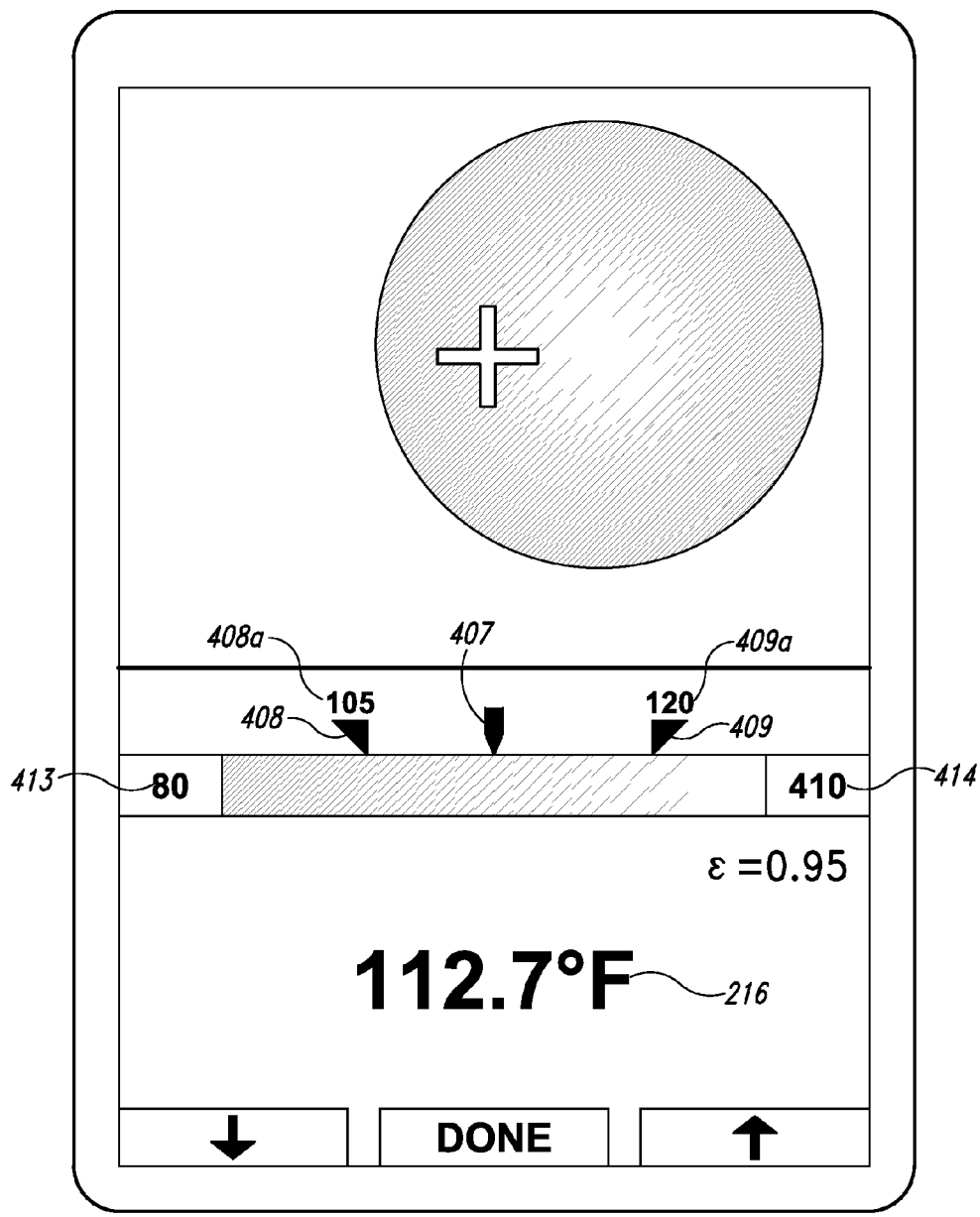

In some embodiments, the alarm indicators and image range bar can be displayed together. As illustrated in FIG. 4D, the temperature of the lower bound is displayed as 80° F. at 413 and the temperature of the upper bound is displayed as 140° F. at 414. Like other embodiments discussed herein, the temperature corresponding to black is displayed proximately to the left end of the image range bar and the temperature corresponding to white is displayed proximately to the right end of the image range bar. This association of temperature and color provides an easy reference for the user to see the temperatures corresponding to the endpoints of the image range bar. In the embodiment illustrated in FIG. 4D, alarm indicators 408 and 409 can be displayed on the image range bar. The alarm indicators 408 and 409 can be repositioned along the image range bar using the methods and interfaces described herein. Temperatures 408A and 409A corresponding to alarm indicators 408 and 409, respectively, can be displayed proximate to the alarm indicators 408 and 409. As the alarm indicators 408 and 409 are repositioned, temperatures 408A and 409A can remain proximate to the alarm indicators. In the example illustrated in FIG. 4D, temperature display 216 indicates that the cursor temperature 407 is 112.7° F.

Figure 4E:
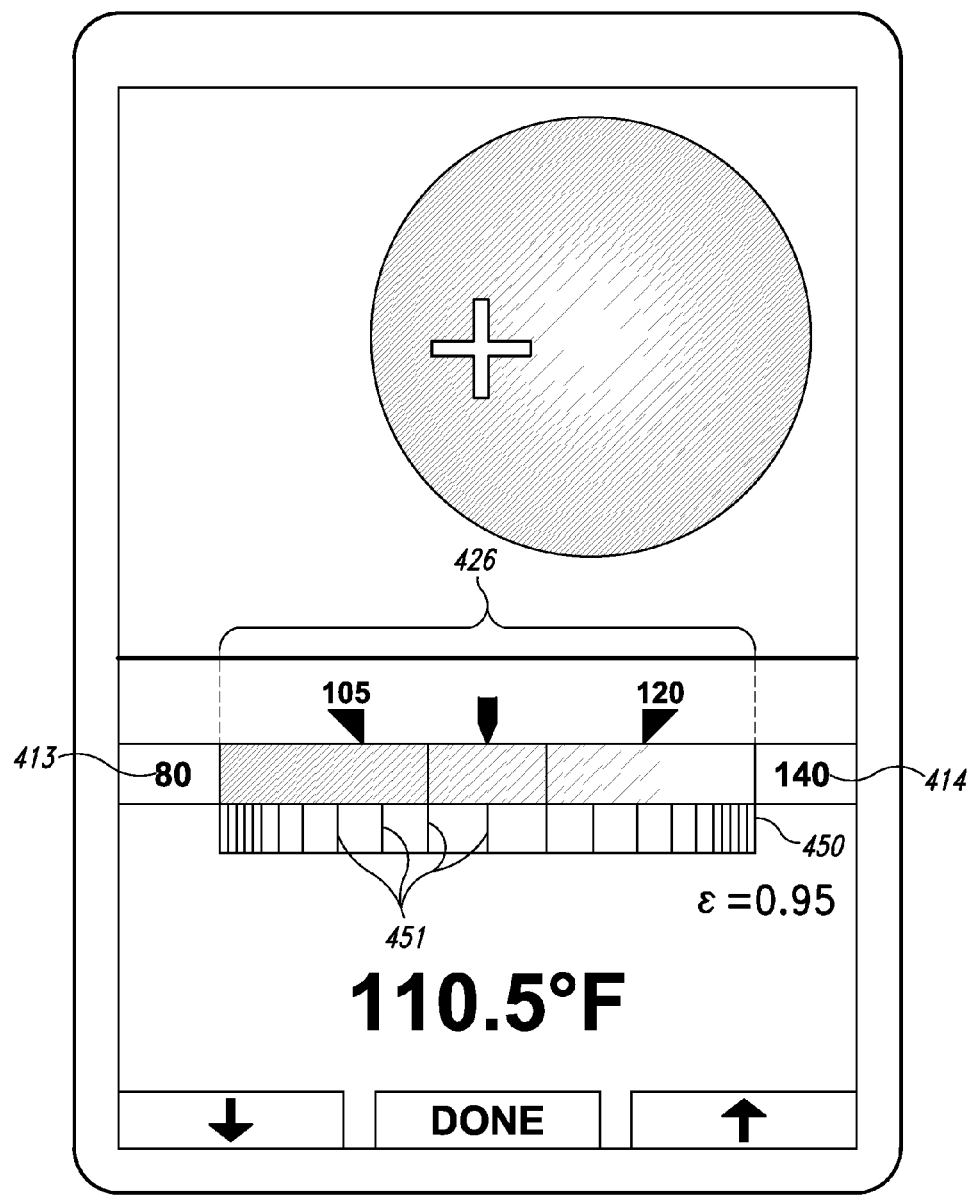

In some embodiments, a non-linear temperature gradient can be used for the color gradient on the image range bar. As illustrated in FIG. 4E, a non-linear image range bar 426 can be displayed. The non-linear scale 450 provides a wider color gradient for temperatures near the temperature of cursor 407 and a narrower color gradient near endpoints 413 and 414. The non-linear scale thus allows a user to see enhanced color detail in the principal area of interest near the temperature cursor 407. Additionally, in some embodiments, a non-linear scale 450 can be displayed proximate to the non-linear image range bar 426. In still further embodiments, the non-linear scale 450 can be displayed in or above the non-linear image range bar 426. The non-linear scale 450 displayed proximate to the non-linear gradient 426 can be used to provide an indication of the degree of non-linear expansion around the temperature cursor. The user interface can be configured to provide an option by which the user can enable or disable non-linear presentation of the image range bar. In some embodiments, the user interface can be configured to provide an option by which the user can configure to degree of non-linear expansion in the image range bar or enable automatic configuration of the non-linear expansion.

Modes

In some embodiments, the span and level parameters can be adjusted manually or automatically. In manual mode, a user can define level and span values manually. In manual mode, the user can fine tune the low bound 411 and high bound 412 values to the desired cut-off levels and configure a temperature span and range to improve color resolution.

Figure 11:
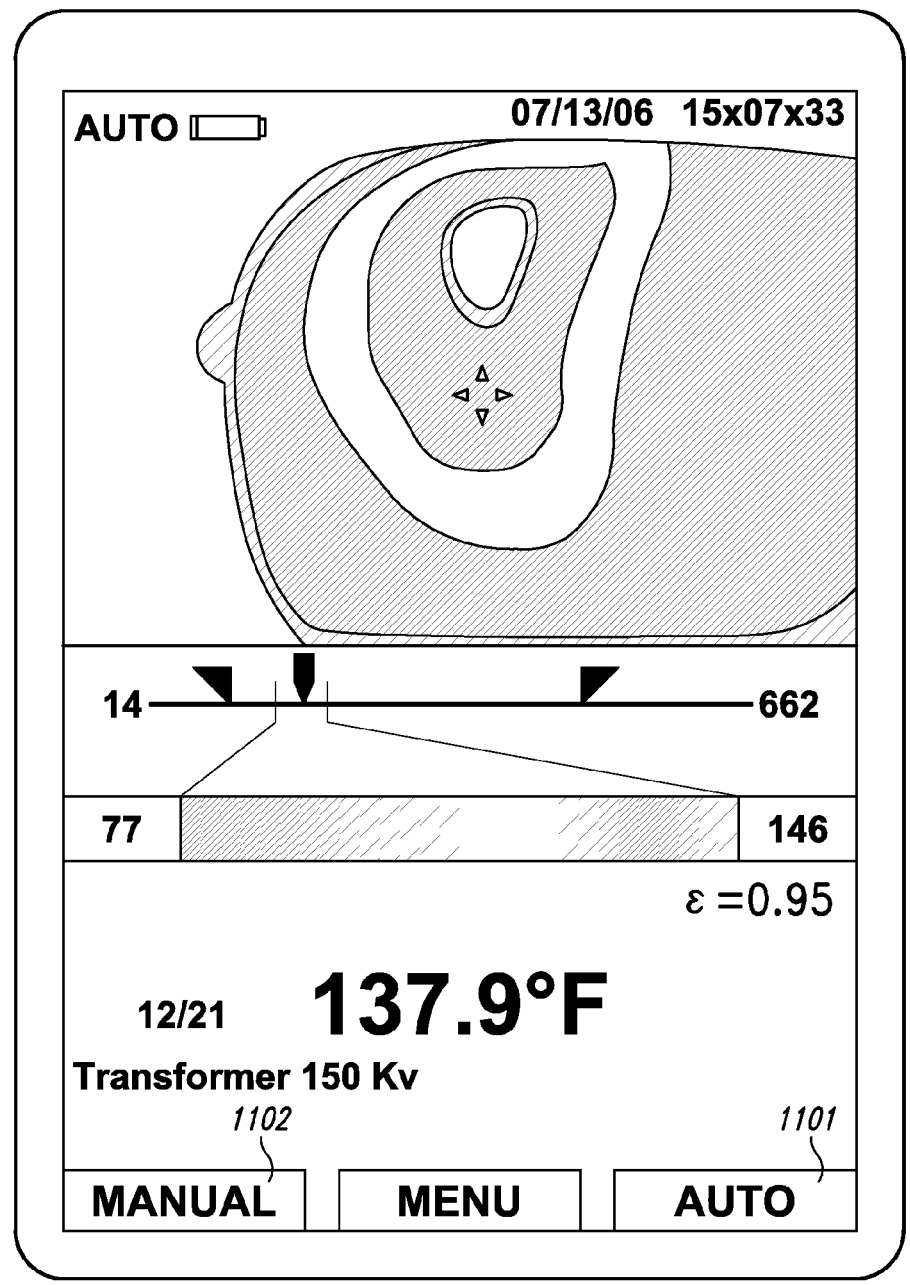
FIG. 11 illustrates an exemplary graphical interface for selecting an operating mode.

In some further embodiments, an interface can be provided for switching between manual and automatic modes. As illustrated in FIG. 11, soft key labels can be displayed for configuring these parameters automatically by selecting the "AUTO" mode 1101 or manually by selecting the "MANUAL" mode 1102. In manual mode, display parameters including the level and span parameters can be set by a user as described above. In automatic mode, the parameters can be automatically set by the device based on the detected scene. In automatic mode, the device can automatically set the low bound 411 at or near the lowest temperature detected in the entire scene and the high bound 413 at or near the highest temperature detected in the scene. Some embodiments can include a semi-automatic mode in which the user can select the span and the level is configured automatically or the user can select the level and the span is configured automatically.

Alarms

Using the interface illustrated in FIG. 3, a button label 301 for setting one or more temperature alarms can be displayed. With reference to FIG. 4C, the alarms can include a low temperature alarm represented by low alarm limit 408 and a high temperature alarm represented by high alarm limit 409.

Figure 12:
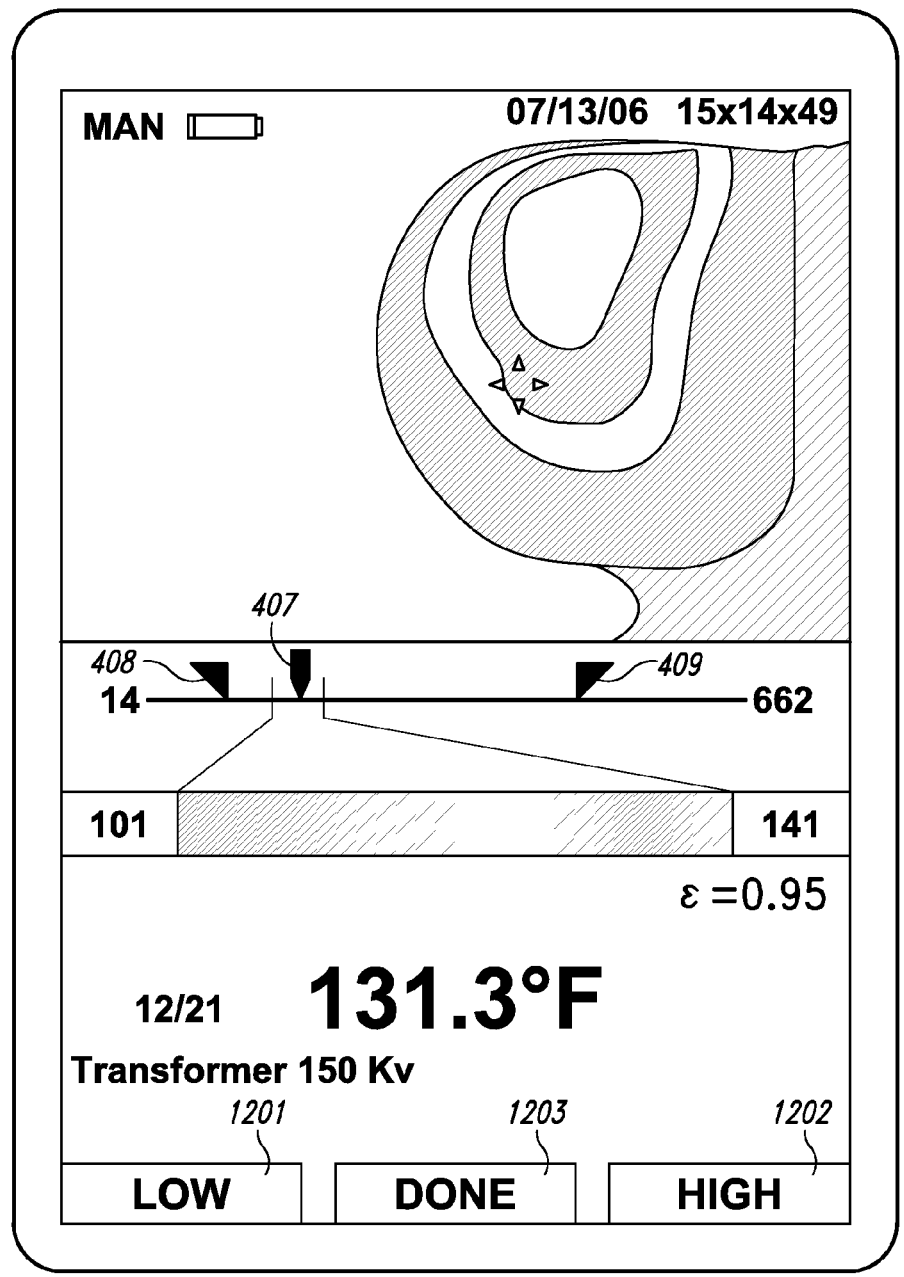
FIG. 12 illustrates an exemplary graphical interface for selecting a high or low alarm.
Figure 13:
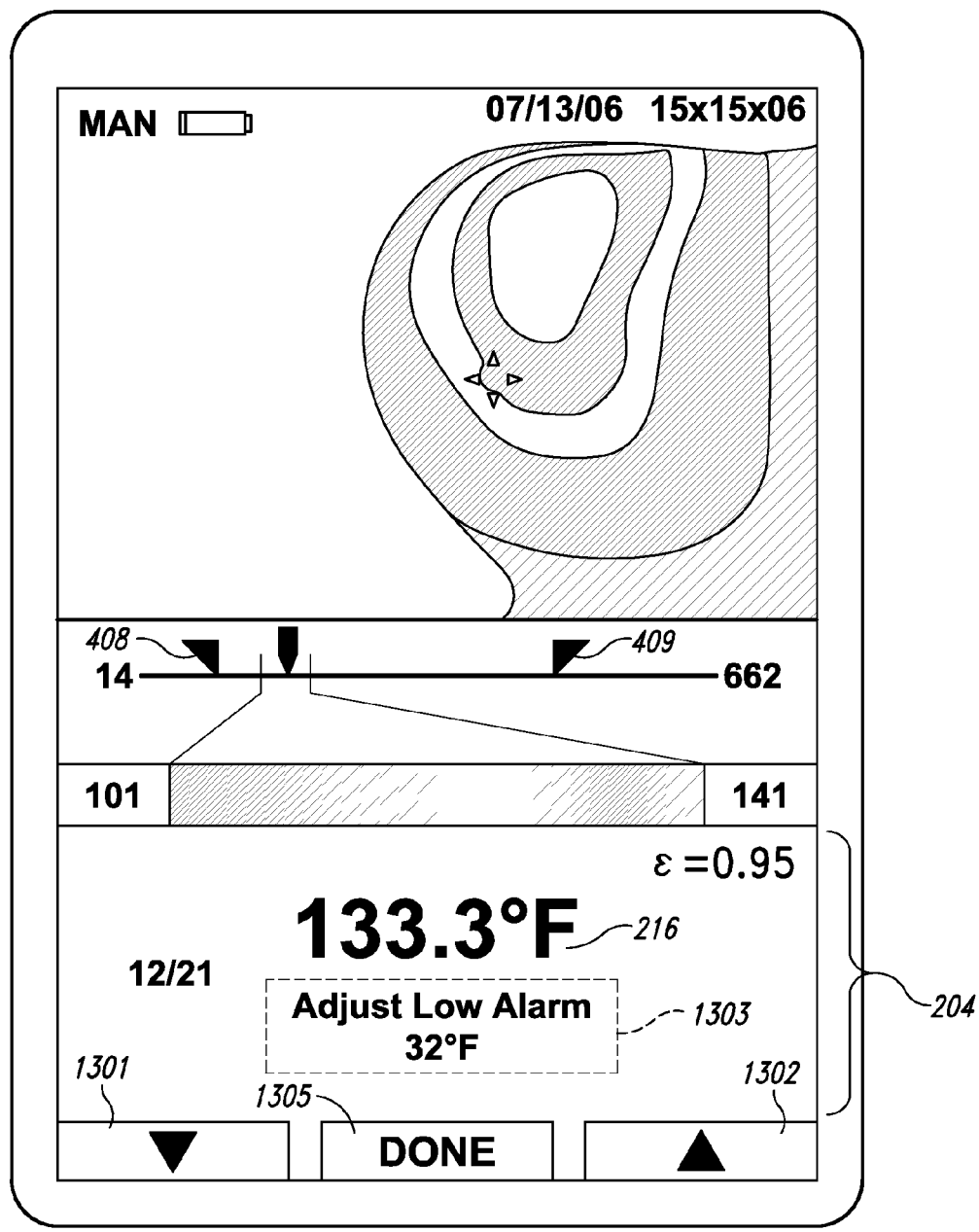
FIG. 13 illustrates an exemplary graphical interface for adjusting an alarm limit.

Selection of the "ALARM" soft key can cause display of the buttons illustrated in FIG. 12. The user can set a high alarm and a low alarm using the corresponding soft keys 1201 and 1202. An exemplary interface for setting the low alarm is illustrated in FIG. 13. The user can use the soft keys corresponding to the down arrow 1301 and the up arrow 1302 to adjust the position of the low alarm limit 408. The interface can be configured to display the temperature 1303 corresponding to the position of the low alarm limit 408. A similar interface can be provided for adjustment of the high alarm limit 409.

The temperature information 1303 and other information in the data area 204 can be displayed in one or more different colors as appropriate. For example, when an alarm limit is adjusted, the lower alarm limit can appear in blue text in the data area 204 and upper alarm limit can appear in red text in the data area 204. The low alarm indicators and high alarm indicators 408 and 409 can also move on device range bar 410 as the alarm values are adjusted. Some embodiments can include a default low alarm limit (for example, 14° F.) and a default high alarm limit (for example, 662° F.). When a user is done adjusting the tags, the user can press the soft key corresponding to the "DONE" option 1305.

In some embodiments, if the temperature at temperature cursor 407 exceeds either of these alarm limits, an alarm notification can be generated. As non-limiting examples, the alarm notification can include a sound, a graphic image, a vibration, or any other sensory experience. In some embodiments, the exceeded alarm limit can flash on the display screen. In some embodiments, the notification can include a blinking alarm indicator on the display and/or the center image can blink and the displayed temperature 216 can turn bold blue and/or start alternating or flashing between bold blue and black. Other colors could be used depending on which limit has been exceeded and one or more preferences defined by a user.

Routing Applications

To improve the usability of imagers, some portable imagers can be programmed to store a predefined route and then prompt the user to proceed to the predefined stops along the route. Some known systems provide a base computer at which a user can define a route that subsequently can be transferred to a portable imaging system. A route, as the term is used herein, is a predefined set of physical locations to be inspected. Typically, a user would record thermal images from a number of locations along a route. These images would be stored on the portable device until they are downloaded to the base computer at the completion of the inspection route.

The imager can store parameters associated with locations on a route and parameters associated with individual images. In some embodiments, some or all of the span, level, and alarm parameter settings for one or more inspection locations can be stored on a handheld imager and can be associated on the handheld with the corresponding locations. The first time a user images an inspection location, the device can store parameters indicating whether the location is to be imaged using an automatic or manual configuration, as well span, level and alarm parameter settings specific to that location. When a user returns to a given route location, the appropriate span, level and alarm parameter settings can be loaded and applied to the display in the portable imager. The imager can also store other parameters associated with a location. As non-limiting examples, other parameters can include location name, comment, emissivity, ambient temperature compensation value, low alarm, and high alarm.

Different locations on a route could be associated with different values for the parameters sets. For example, when a user is at inspection Location A, a lower bound of 62° F. and an upper bound of 222° F. might be recalled along with a high alarm limit of 200° F. The display could be configured accordingly. At Location B, a lower bound of 100° F. and an upper bound of 315° F. might be recalled along with a high alarm limit of 300° F. As discussed above, the alarm limits recalled can be applied to the device range bar 410 so that the lower and upper alarm limits define the lower and upper range of the device range bar.

In some embodiments, certain parameters can be stored in connection with a recorded image independently of its location on a route. As non-limiting examples, these parameters can include location name, comment, emissivity, ambient temperature compensation value, low alarm, high alarm, image time, color palette, target temperature, internal temperature, minimum temperature, and maximum temperature.

In some embodiments, various parameters that are stored on the handheld and associated with inspection locations and/or recorded images can be transferred to a base computer. For example, the span, level and alarm settings can be transferred to a base computer. Once on the base computer, the span, level and alarm parameters can maintain their association with the image. In some embodiments, recorded images and locations can be displayed based on the associated parameters and the parameters can be displayed with the image at the base computer. For example, an alarm parameter set by a user on the handheld device can be applied to the corresponding image on the base computer and the base computer can present the alarm.

In some embodiments, one or more of the span, level and alarm parameters can be input by a user at the base computer so that the parameters are associated with one or more inspection locations. These parameters can then be transferred to the handheld so that when the user is at a certain inspection location with the handheld, the associated parameters can be applied at the imager automatically. For example, an alarm set at the base computer can be generated on the handheld when the user is at a predetermined inspection location.

One of skill in the art would appreciate that while the interface is described with reference to display labels which correspond to soft keys, the interface could also be implemented using a touch screen or any other device that receives input from a user in response to a visual, audible, or tactile prompt.

Many specific details of certain embodiments of the invention are set forth in the description and in FIGS. 1-13 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention.

From the foregoing, it will be appreciated that specific embodiments of the invention have been described herein for purposes of illustration, but that various modifications may be made without deviating from the invention. Aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention.

We claim:

1. A graphical user interface comprising:
 a display configured for providing a thermal image including a range of colors corresponding to a range of temperatures, the display utilizing a range bar including a color gradient corresponding to the range of temperatures;
 an input configured for identifying a portion of the thermal image having a temperature; and
 wherein the color gradient includes a wider color gradient near the temperature of the identified portion of the thermal image and a narrower color gradient near an end of the range of temperatures.

2. The graphical user interface of claim 1 wherein the wider color gradient comprises a greater number of colors than the narrower color gradient.

3. The graphical user interface of claim 1 wherein the color gradient further includes another narrower color gradient near another end of the range of temperatures.

4. The graphical user interface of claim 1 wherein the display is configured for providing a non-linear scale displayed proximate to the range bar.

5. The graphical user interface of claim 1 wherein the display is configured for providing a non-linear scale displayed in the range bar.

6. The graphical user interface of claim 1, further comprising a control configured for enabling and disabling a non-linear display of the range bar.

7. The graphical user interface of claim 1, further comprising a control configured for expanding and contracting the wider color gradient relative to the narrower color gradient.

8. The graphical user interface of claim 7 wherein the control is automatic.

* * * * *